United States Patent [19]

Asai

[11] Patent Number: 5,402,414
[45] Date of Patent: Mar. 28, 1995

[54] TIME SLOT INTERCHANGE APPARATUS FOR MAINTENANCE DEDICATED LINE OF SIGNAL TRANSMISSION APPARATUS

[75] Inventor: Toshiaki Asai, Osaka, Japan

[73] Assignee: Fujitsu Limited, Kanagawa, Japan

[21] Appl. No.: 189,165

[22] Filed: Jan. 28, 1994

[30] Foreign Application Priority Data

Aug. 17, 1993 [JP] Japan ................... 5-203444

[51] Int. Cl.⁶ ............................................. H04J 3/02
[52] U.S. Cl. ..................................... 370/58.2; 370/68
[58] Field of Search .................. 370/66, 68, 53, 58.1, 370/84, 100.1, 79, 102, 63, 58.2, 58.3

[56] References Cited

U.S. PATENT DOCUMENTS

| | | | |
|---|---|---|---|
| 4,621,357 | 11/1986 | Naiman et al. | 370/58.2 |
| 5,226,042 | 7/1993 | Ardon et al. | 370/68 |
| 5,301,190 | 5/1994 | Tsukuda et al. | 370/68 |

Primary Examiner—Douglas W. Olms
Assistant Examiner—Ajit Patel

[57] ABSTRACT

A time slot interchange apparatus for a maintenance dedicated line of a signal transmission system, capable of utilizing effectively the orderwire line having only one line and of avoiding a crosstalk, data error or the like, has switching units for on/off switching the line at both sides of each of the signal transmission stations, and a control circuit which controls the on/off switching of the switching units, so that, at calling in, the opposite line is made to be off and, at calling out, the line opposite to the calling station is made to be off.

3 Claims, 12 Drawing Sheets

FRAME FORMAT OF STS-12(STS-1×12 MULTIPLE)(622.08Mbps)

TIME SLOT INTERCHANGE APPARATUS FOR MAINTENANCE DEDICATED LINE OF SIGNAL TRANSMISSION APPARATUS

BACKGROUND OF THE INVENTION

1. Field of the Invention

The present invention relates to a maintenance dedicated line at a signal transmission system, so-called an orderwire.

2. Description of the Related Art

An orderwire is a maintenance dedicated line of a signal transmission apparatus, and is provided, for example, at a manhole for an under ground cable, and the like, usually as a station having no interchanging function, for the purpose that an operator, who mainly performs a maintenance operation, uses it.

FIG. 1 is a schematic diagram showing such general orderwire line,

In FIG. 1, reference characters SA, SB, SC, SD and SE designate stations respectively having orderwire functions, and the respective inherent calling numbers "111", "222", "333", "444" and "555" are assumed to be set in advance.

In addition, in FIG. 1, telephones TEL1, TEL2, TEL3, TEL4 and TEL5 are connected respectively to the stations SA, SB, SC, SD and SE, however, these telephones TEL1, TEL2, TEL3, TEL4 and TEL5, in reality, are used by an operator who performs maintenance operation every time at need by connecting his (or her) portable telephone to any of the station SA, SB, SC, SD or SE.

The convenience of explanation, in the following drawings, the left side is called to be W side and the right side to be E side.

FIG. 2 is a block diagram showing a configuration of a conventional apparatus for the orderwire line of each station SA, SB, SC, SD and SE.

In FIG. 2, a signal line L1 is inputted from the W side to the station S and outputted to the E side through a demultiplexing circuit (DMUX) 11W which demultiplexes a multiplexed signal, a codec circuit 13W which performs analog/digital conversion or digital/analog conversion, an adding unit A1, a codec circuit 13E, and a multiplexing circuit (MUX) 12E.

On the other hand, in FIG. 2, the signal line L2 is inputted from the E side to the station S and outputted to the W side through a demultiplexing circuit 11E, the codec circuit 13E, an adding unit A2, the codec circuit 13W, and multiplexing circuit 12W.

Reference character A3 designates an adding unit, and a signal is inputted thereto from a portion between the codec circuit 13W and the adding unit A1on the signal line L1 and a portion between the codec circuit 13E and the adding unit A2 on the signal line L2, and adds them to output to a station number detecting circuit 14.

The station number detecting circuit 14 is specifically a DTMF (Dial Tone Multi-Frequency) receiver, which distinguishes the DTMF tone of a push button type telephone, thereby detecting a station number from a signal obtained by adding the two signals inputted from the two signal lines L1 and L2.

Reference numeral 15 designates a station number coincidence detecting and call in operating unit which performs a call in operation when it detects that a station number detected by the station number detecting circuit 14 coincidence with the station number set in itself.

Reference numeral 16 designates a telephone interface (TEL I/F), which outputs a signal inputted from the both signal lines L1 and L2 to the telephone TEL through the adding unit A3 and the station number detecting circuit 14, and outputs a signal inputted from a telephone TEL to the signal line L1 after adding it at the adding unit A1 and to the signal line L2 after adding at the adding unit A2.

As described above, since the orderwire line has no interchanging function, the stations SA, SB, SC, SD and SE shown in FIG. 1 are connected to the same line. In the case where a telephone communication is performed with such orderwire line, when an operator calls out by connecting the telephone TEL to a certain station and by pushing the pushing button, the DTMF tone is transmitted to the other stations. The station of the call in side judges whether the calling is for itself or not, and when it is the calling for itself, a call in operation is performed to inform the operator.

Accordingly, when a communication is performed by using the orderwire line between the stations SA and SB, as shown in FIG. 1, since the signal inputted to the telephone TEL is obtained by adding signals from the signal lines L1 and L2 of both sides at the adding unit A3 similarly to be interfaced by the TEL I/F 16, as shown in FIG. 2, when a communication is performed between the station SC or SD, a cross talk is caused between the stations SA and SB.

Therefore, in order to enable a communication also between the stations SC and SD at the same time of a communication between the stations SA and SB by using the orderwire line, the line between the stations SB and SC is cut-off only with respect to the orderwire line, by time slot interchanging in advance. By such time slot interchanging, a communication between the stations SC and SD due to the orderwire line also becomes possible at the same time of a communication between the stations SA and SB due to the orderwire lines.

By the way, in order to perform communications between the stations SA and SB, and the stations SC and SD, it is necessary to perform time slot interchanging in advance by same means. When such a time slot interchanging is performed, a communication between the stations SA and SC or SD, or that between the stations SB and SC or SD cannot be done by the orderwire line, it is necessary to cope with the situation by performing a different time slot interchanging.

Meanwhile, in the SDH (Synchronized Digital Hierarchy) which is a network for using the ISDN (Integrated Services Digital Network) practically, 2 bytes (E1 and E2 byte) in a frame which has transmitting ability of 64 K bit/second per one byte are provided for the orderwire.

FIG. 3 is a schematic diagram showing a frame format of such SDH.

One frame is composed of 1080 bytes (90 bytes×12 multiplex)×9 rows, and it is roughly composed of an overhead portion which is a header for a frame synchronizing signal and data for transmitting various auxiliary signals, and of a pay-load portion for transmitting information data. In addition, a frame repeating cycle, that is, one frame cycle is 125 μs.

The overhead portion includes all of the various signals necessary for transmitting multiplexed signals such as frame synchronizing signals, error supervising codes, channel discriminating signal, channel for maintenance, alarm signal, and the like.

Each one byte of E1 and E2 is allocated to one multiframe for the use of the orderwire in the overhead portion, and other control signals are not included. Therefore, in the transmission system, for example, in which transmission apparatuses DA, DB, DC, DD and DE shown in FIG. 4 are connected by optical fibers, in order to perform a communication between all of the transmission apparatuses DA, DB, DC, DD and DE by the orderwire, the configuration of each transmission apparatus is needed to be the one as shown in a block diagram of FIG. 5.

In FIG. 5, an optical signal inputted from an optical fiber F1W at the W side is inputted to an overhead data extracting circuit 23W through an O/E converter 21W which performs optical/electric (O/E) conversion and a demultiplexing circuit (DMUX) 22W which demultiplexes a multiplexed signal, to be extracted only of the overhead portion thereof. The E1 and E2 bytes of the overhead portion are converted into analog signals by a codec circuit 31W of an orderwire outside interface unit 50.

In FIG. 5, an optical signal inputted from an optical fiber F1E at the E side is inputted to an overhead data extracting circuit 23E through an O/E converter 21E which performs optical/electric (O/E) conversion and a demultiplexing circuit (DMUX) 22E which demultiplexes a multiplexed signal, to be extracted only of the overhead portion thereof. The E1 and E2 bytes of the overhead portion are converted into analog signals by a codec circuit 31E of the orderwire outside interface unit 50.

The analog signals outputted from the two codec circuits 31W and 31E are added at an adding unit 33 and outputted to a terminal equipment TER such as a telephone from an orderwire analog interface 38. On the contrary, an input from the terminal equipment TER such as a telephone is branched to the two codec circuits 31W and 31E at the branching unit 37. One branched signal is added to an analog signal outputted from the codec circuit 31E and branched at a branching unit 32 at the adding unit 36, to be given to the codec circuit 31W. The other branched signal is added to an analog signal outputted from the codec circuit 31W and branched at the branching unit 35 at the adding unit 34 to be given to the codec circuit 31E. At the codec circuit 31W, the E1 and E2 bytes of analog signal are converted into digital signals to be given to an overhead data inserting circuit 24W. At the codec circuit 31E, the E1 and E2 bytes of an analog signal are converted into digital signals to be given to an overhead data inserting circuit 24E.

At the two overhead data inserting circuits 24W and 24E, the E1 and E2 bytes are inserted into overhead data and further to main signals, time-division multiplexed by multiplexing circuits (MUXs) 25W and 25E, converted into optical signals by E/O converters 26W and 26E to be outputted to the optical fibers F2W and F2E.

In such a configuration as abovementioned, when a communication is performed by the orderwire between, for example, the transmission apparatuses DB and DD, shown in FIG. 4, it is necessary for the transmission apparatus DC to convert a digital signal into an analog signal, and further to convert it to a digital signal again.

Therefore, as shown, for example, in FIG. 6, such a configuration as to use digital interfaces 39W and 39E as the interfaces for the orderwire can also be thought of. In this case, it is necessary for the interfaces 39W and 39E of a transmission apparatus which does not input-/output to perform digital-through, however, the control signals therefor are not prepared in the overhead portion thereof, resulting in setting them separately.

By the way, in the SDH, besides using the orderwire for the original maintenance operation by an sound signal, utilizing the orderwire for data communication by connecting a modem thereto, further utilizing the whole 64K bits for data communication, are increased recently.

For data communication, the maximum problem is a signal error on the way of transmitting a signal. Explanation will be given on the case, for example, when data communication is performed between the transmission apparatuses DB and DD shown in FIG. 4.

The data transmitted from the transmission apparatus DB reaches the transmission apparatus DD via the transmission apparatus DC. At that time, in the case where the transmission apparatus DC has a conventional configuration shown in FIG. 5, when an operator at the transmission apparatus DC uses the orderwire by mistake, the same orderwire lines are accessed to cause a crosstalk because control signals are not set there, resulting in a data error.

In this case, where the transmission apparatus has a configuration shown in FIG. 6, a data error is not generated when digital through is possible, however, setting therefor in advance is necessary. It is also necessary to distinguish whether or not the orderwire line is used by the other operator, but a problem is that it is difficult to do so.

As mentioned above, since only one line is provided to a maintenance dedicated line of a conventional signal transmission apparatus, i.e. an orderwire, in order to perform communications at plural sections of the line, it is necessary to time slot interchanging by some means.

In the orderwire of the SDH, an intermediate transmission apparatus of the communication section must convert a digital signal into an analog signal, and further to a digital signal again. Also when digital interfaces are used as the ones for the orderwire, it is necessary for interfaces of a transmission apparatus which does not input/output to perform digital through, however, control signals therefor are not prepared in the over head portion of a frame, resulting in setting them separately.

Further, a data error is not caused when digital interfaces are used, but advance setting therefor is necessary, and is it also necessary to distinguish whether or not the orderwire line is used by the other operator, but the problem is that it is difficult to do so.

SUMMARY OF THE INVENTION

The present invention has been devised in such circumstances as mentioned above, and the object thereof is to provide a time slot interchange apparatus for a maintenance dedicated line of a signal transmission apparatus capable of utilizing the orderwire line with only one line effectively and of avoiding a crosstalk or a data error.

According to the first aspect of the present invention, each signal transmission apparatus (station) (SA, SB, SC, SD, SE) is provided with switching means (S1, S2) for switching on/off the line at the both sides thereof, and with a control circuit (17) which controls the switching means (S1, S2) so that an opposite line is made off when calling in, and a line opposite to a partner is made also off when calling out.

According to the second aspect of the present invention, by controlling one (E2 byte) of the specified areas (E1, E2 bytes) prepared in advance for the orderwire in a frame of the SDH by a specified area (Z2 byte) prepared in advance similarly for extension, time slot interchanging is performed.

According to the first aspect of the present invention, when the orderwire line is set between the two signal transmission apparatuses (stations) (SA, SB, SC, SD, SE), the section between them is separated from the other sections.

And according to the second aspect of the present invention, setting of the orderwire line, that is a specified area (E2 byte) in a frame being-used, can be informed by a specified area (Z2 byte) in a frame, to the respective transmission stations (DA, DB, DC, DD, DE).

The above and further objects and features of the invention will more fully be apparent from the following detailed description with accompanying drawings.

DESCRIPTION OF THE PREFERRED EMBODIMENTS

In the following, explanation will be made on the invention in detail referring to drawings showing the embodiments thereof.

Figure 1:
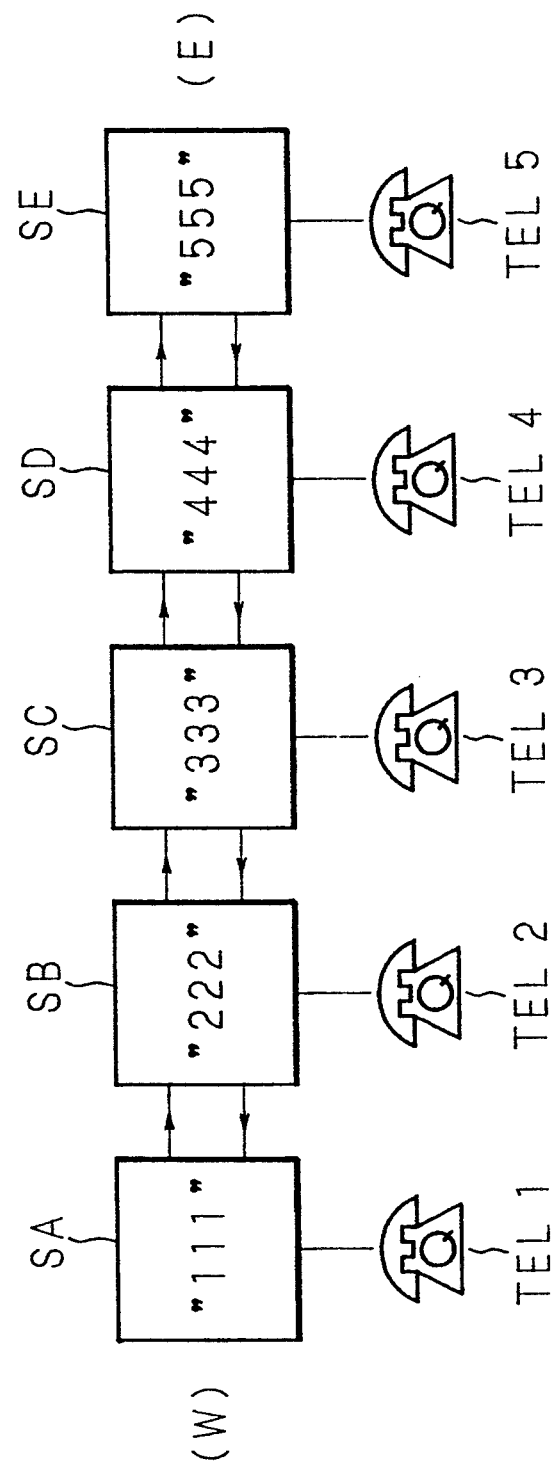
FIG. 1 is a schematic diagram showing a general orderwire line.
Figure 2:
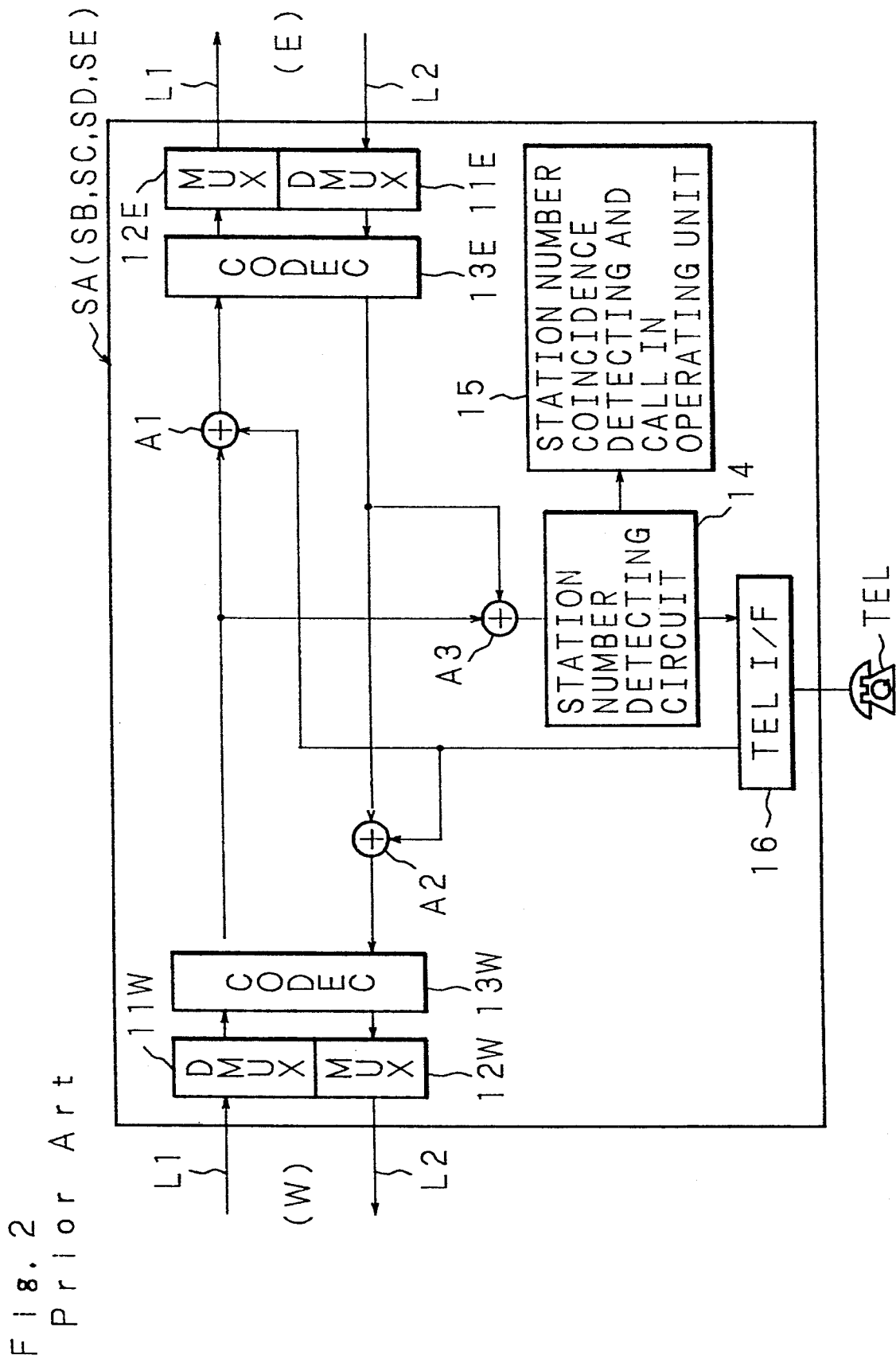
FIG. 2 is a block diagram showing a configuration of a conventional apparatus for time slot interchanging of the orderwire.
Figure 7:
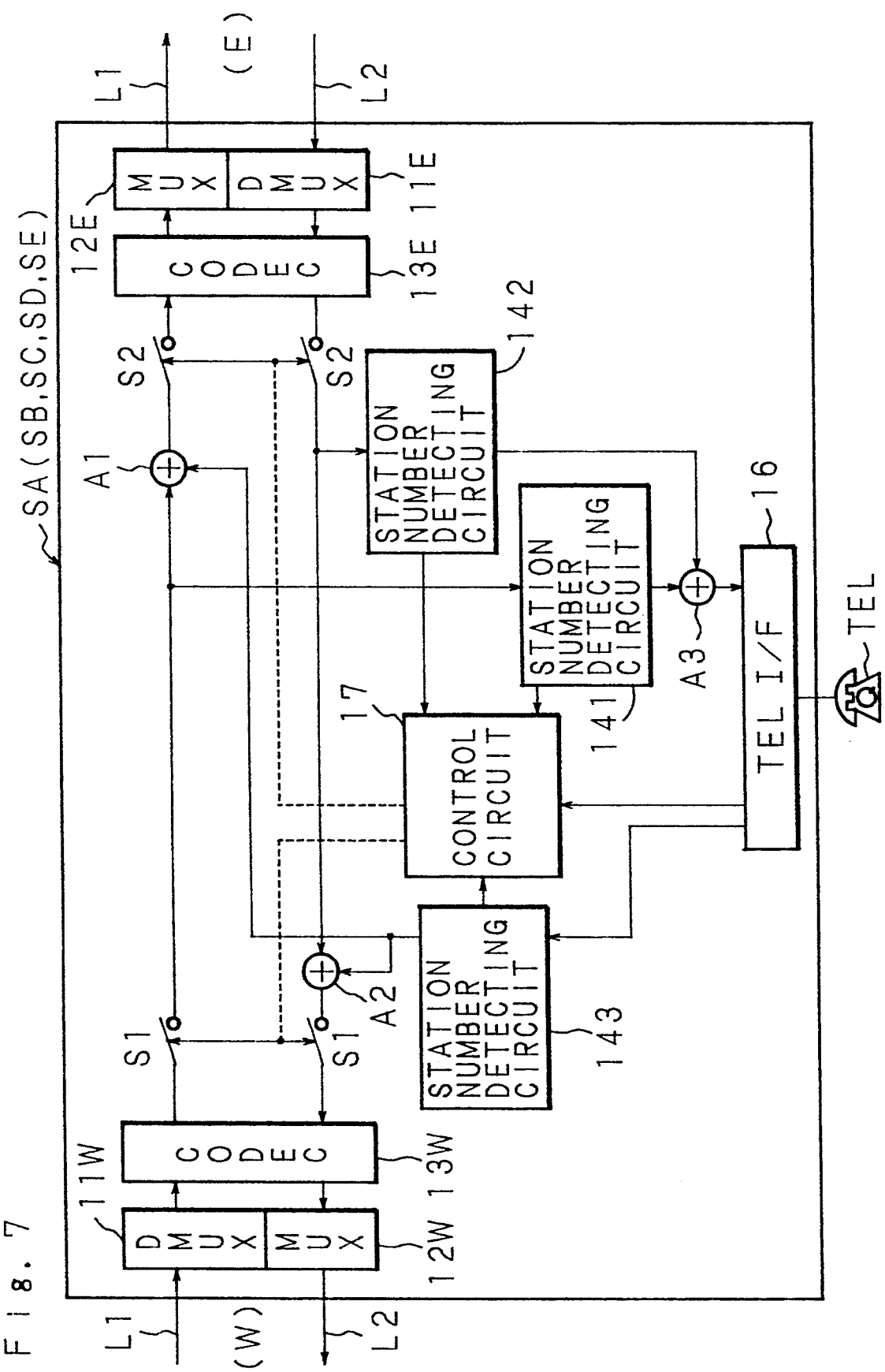
FIG. 7 is a block diagram showing a first embodiment of the first invention of the present invention.

FIG. 7 is a block diagram showing an embodiment of the first aspect of the present invention, in which a concrete configuration of each of the stations SA, SB, SC, SD and SE of the transmission system shown in aforementioned FIG. 1 is shown.

In FIG. 7, a signal line L1 is inputted from a W side to a station S and outputted to the E side through a demultiplexing circuit (DMUX) 11W which demultiplexes a multiplexed signal, a codec circuit 13W which performs analog/digital conversion and digital/analog conversion, a switch S1, an adding unit A1, a switch S2, a codec circuit 13E and a multiplexing circuit (MUX) 12E.

On the other hand, a signal line L2 is inputted to a station S from the E side, and outputted to the W side through a demultiplexing circuit (DMUX) 11E, the codec circuit 13E, the switch S2, an adding unit A2, the switch S1, the codec circuit 13W and a multiplexing circuit 12W.

Reference numeral A3 designates an adding unit which inputs a signal from a portion between the switch S1 and the adding unit A1 on the signal line L1 through a station number detecting circuit 141, and a signal from a portion between the switch S2 and the adding unit A2 on the signal line L2 through a station number detecting circuit 142, respectively, and adds them to each other to output the result to a telephone interface (TEL I/F) 16.

The station number detecting circuits 141 and 142 are specifically DTMF (Dial Tone Multi-Frequency) receivers, which detect a station number from a signal obtained by adding signals inputted from the two signal lines L1 and L2, by distinguishing the DTMF tone of a push-button type telephone.

Reference numeral 17 designates a control circuit which is composed of a station number coincidence detecting unit, call in operation unit, and line switching unit. The control circuit 17 performs a call in operation when the station number detected by the station number detecting circuit 141 or 142 is detected to be coincided with the station number set in itself, and at the same time, as shown by broken lines in FIG. 7, controls switching of the aforesaid switches S1 and S2.

Reference numeral 16 designates a telephone interface, as aforementioned, which outputs a signal inputted from the two signal lines L1 and L2 through the adding unit A3 to the telephone TEL, and outputs a signal inputted from the telephone TEL to the control circuit 17 and the station number detecting circuit 143.

Also the station number detecting circuit 143 is concretely a DTMF receiver, which outputs a signal inputted from the TEL I/F 16 to the adding units A2 and A1, and at the same time detects the station number, to give the result to the control circuit 17. The control circuit 17, not only in case of call in, but also in case of call out, controls the switches S1 and S2 corresponding to the detection result by the station number detecting circuit 143.

At the adding unit A1, a signal from the station number detecting circuit 143 is added to a signal on the signal line L1. At adding unit A2, a signal from the station number detecting circuit 143 is added to a signal on the signal line L2.

In addition, in each of the stations SA, SB, SC, SD and SE having the configuration of the present invention shown in FIG. 7, the line is so constructed as to be shown in FIG. 1 aforementioned, and the respective stations are assumed to have the inherent calling numbers "111", "222", "333", "444", "555", similarly.

When a telephone communication is performed in such a configuration of the invention as aforementioned, an operator performs a call out by connecting a telephone to a certain station and by pushing the push button, and the DTMF tones are transmitted to the other stations. Concretely, for example, "#" as a signal to start call out, and next, numeral keys of three digits are operated, to transmit DTMF tones.

In addition, it is a matter of course that another key can be used in place of "#".

Now, take an example for the case where call out is performed from the station B to the station A.

Usually the switches S1 and S2 of any station are closed. At the stations SB, an operator hooks off a receiver of a telephone TEL and operates the keys "#111". The DTMF tone generated by the key operation are judged as to which station they are directed, and judged as to whether the station is E side or W side from the view point of itself. In this case, since the station SA is at the W side from the station SB, the control circuit 17 opens only the switch S2 and shuts off a signal from the E side.

The station SA recognizes the "#111" inputted as the DTMF tone to be directed to itself at the station number detecting circuit 142 and the control circuit 17, and performs a call in operation. At that time, at the station SA, both of the switches S1 and S2 keep the state as it has been, that is, the closing state.

In the case where the communication is finished, at the station SA, when an operator hooks on a receiver, all of the operations are finished. But at the station SB, when the TEL I/F 16 detects the on hook of the receiver, the control circuit 17 resets both of the switches S1 and S2. Thereby, the two switches S1 and S2 return to the closing state. In the following, also at the station SB, it becomes possible to receive a signal either from the W side or E side.

Next, a case where, for example, the station SA calls out the station SB is considered.

At the station SA, when a receiver is hooked-off and "#222" is transmitted, since the station SA recognizes the call in to be directed to the E side by the station number detecting circuit 143 and the control circuit 17, the control circuit 17 opens only the switch S1.

However, since the station SA is connected to the other station only at the E side, it is all right if the aforementioned operation is not performed.

Since the station SB recognizes the call in to be directed to itself by the station number detecting circuit 141 and the control circuit 17, it performs a call in operation after opening only the switch S2. At the time of finishing the communication, in the same way as aforementioned, the two switches S1 and S2 are reset after the TEL I/F 16 detects the hook-on of the receiver.

As aforementioned, during a communication between the stations SA and SB, since the line becomes independent only between the stations SA and SB, the other stations SC, SD and SE are capable of communicating at the section excluding the section being used for communication, that is, the section between the stations SA and SB.

In the case where, for example, another station SB or SC is interposed between two stations which directly communicate with each other such as the stations SA and SC, or the stations SA and SD, each of the stations SB, SC or the like recognizes that the call in is not directed to itself by its station number detecting circuit 141 and the control circuit 17, it does not perform a call in operation with the switches S1 and S2 closed as they have been.

In addition, when a receiver is not hook-off at the call in station, there is a probability that a communication from another station becomes impossible because the line is cut off at that station. In case of such a situation, it is preferable for each station to have a timer so that the two switches S1 and S2 are reset when a predetermined time passed from a call out.

Figure 8:
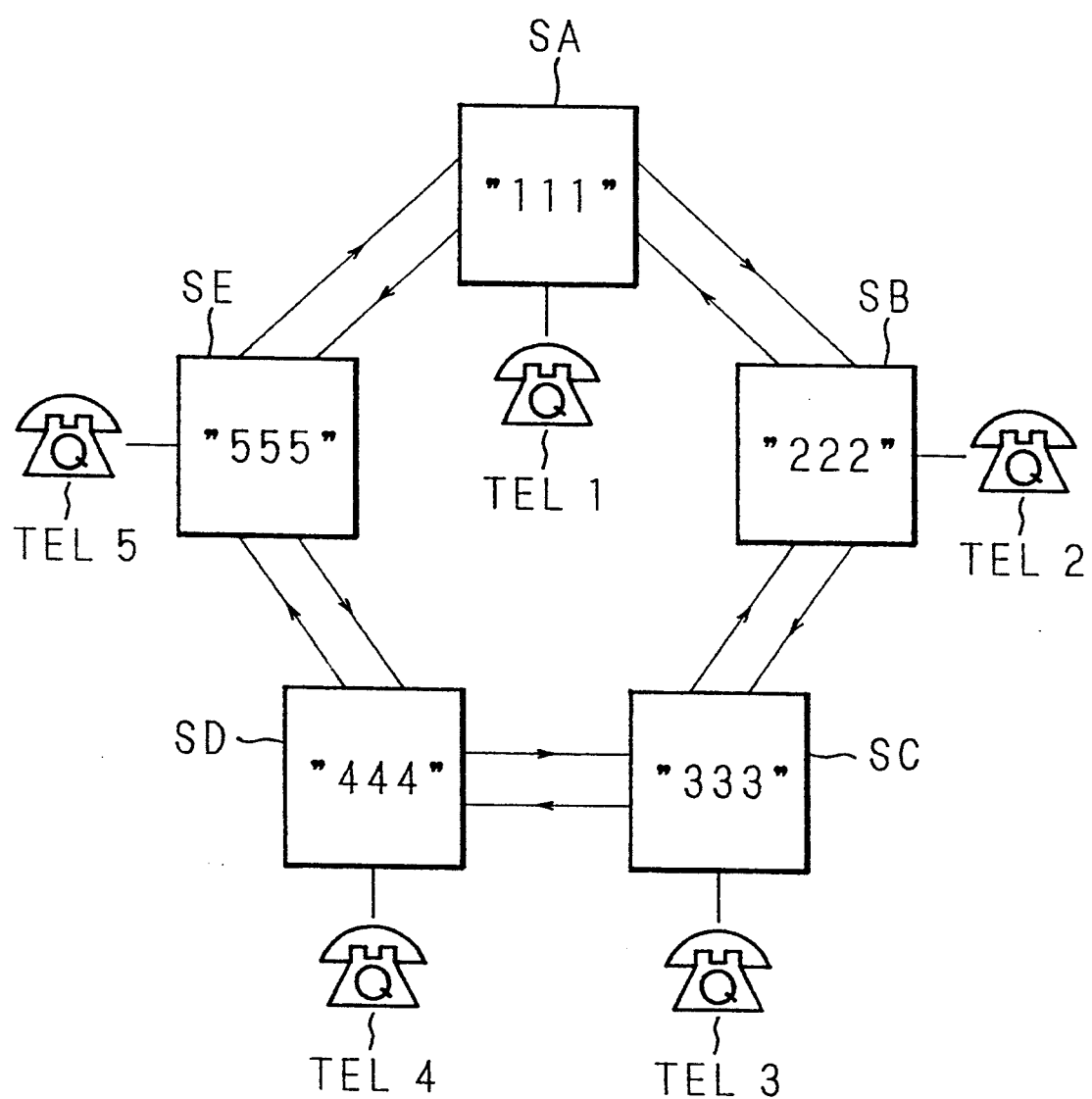
FIG. 8 is a schematic diagram showing a general line being in a state of a ring.

The schematic diagram of FIG. 8 shows an example in which the stations SA, SB, SC, SD and SD are connected in a state of a ring.

Figure 9:
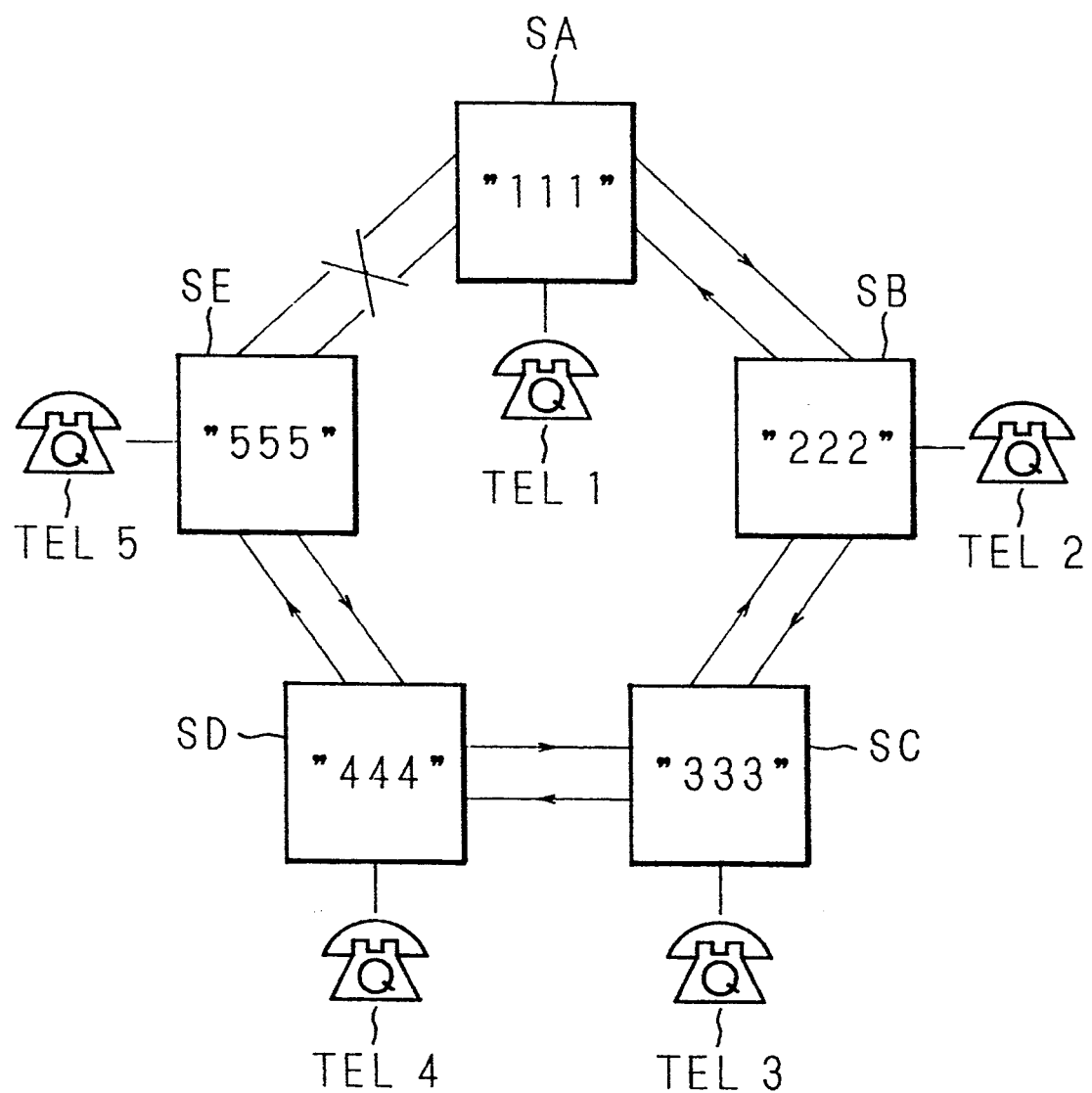
FIG. 9 is a schematic diagram showing an orderwire line at a general line in a state of a ring.

In this case, a main signal constructs a transmission system of a ring state, however, since the orderwire line generates howling because a signal is not terminating when the line is in a state of a ring, it has to be cut necessarily at any portion, for example, position between the stations SA and SE as shown in FIG. 9. In such a case, for the orderwire, the configuration is totally the same as that shown in FIG. 1.

Figure 10:
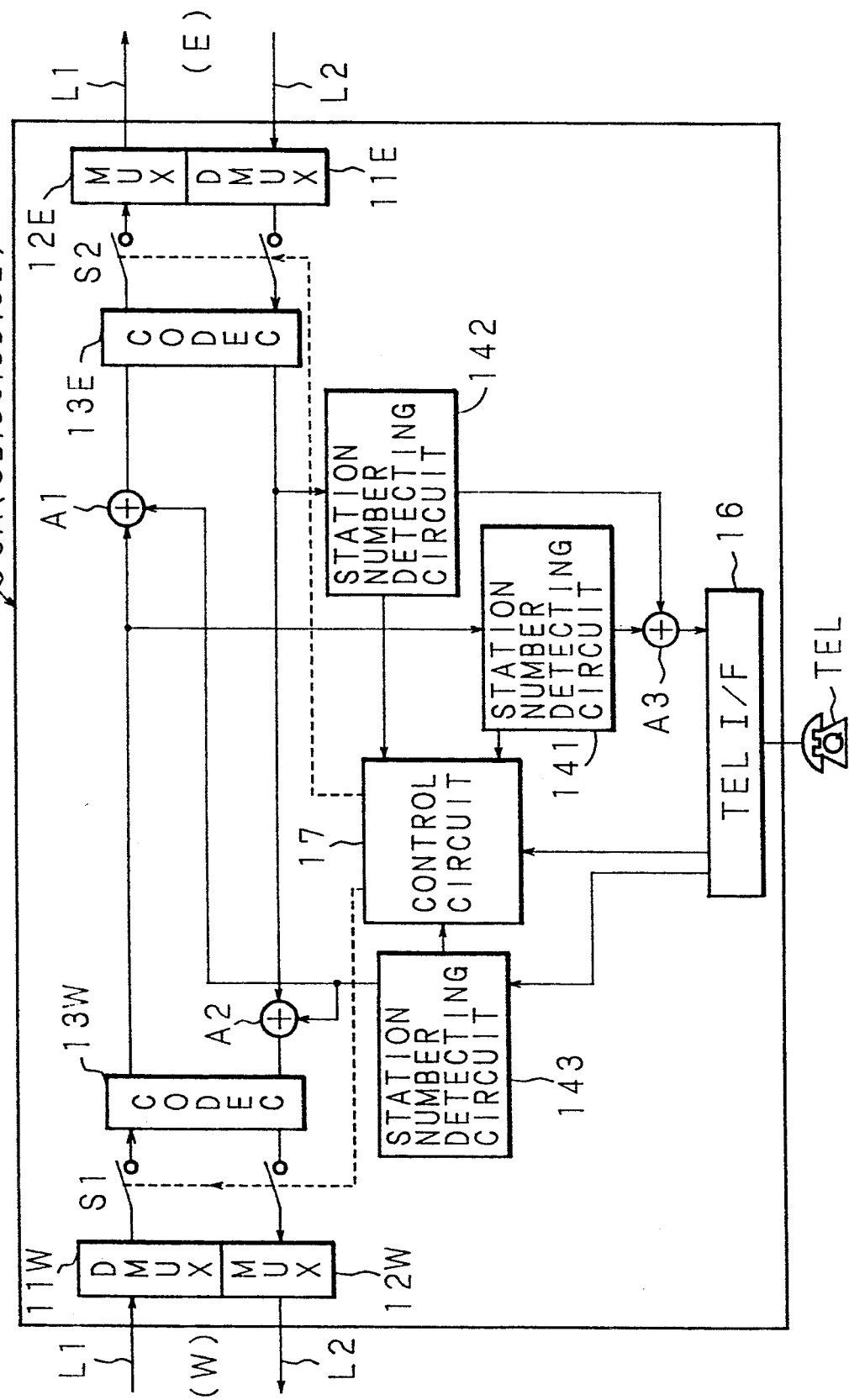
FIG. 10 is a block diagram showing another embodiment of the present invention.

FIG. 10 is a block diagram showing a configuration example of the case where the switches S1 and S2 are respectively put between the codec circuit 13W and demultiplexing circuit 11W, multiplexing circuit 12W, and between the codec circuit 13E and demultiplexing circuit 11E, multiplexing circuit 12E, this configuration being different from the configuration of FIG. 7. Also, in case of the configuration of FIG. 10, the effect of the invention is not damaged. Further, it is possible to configure the switches S1, S2 by a logic circuit, such as an AND gate, respectively.

Figure 11:
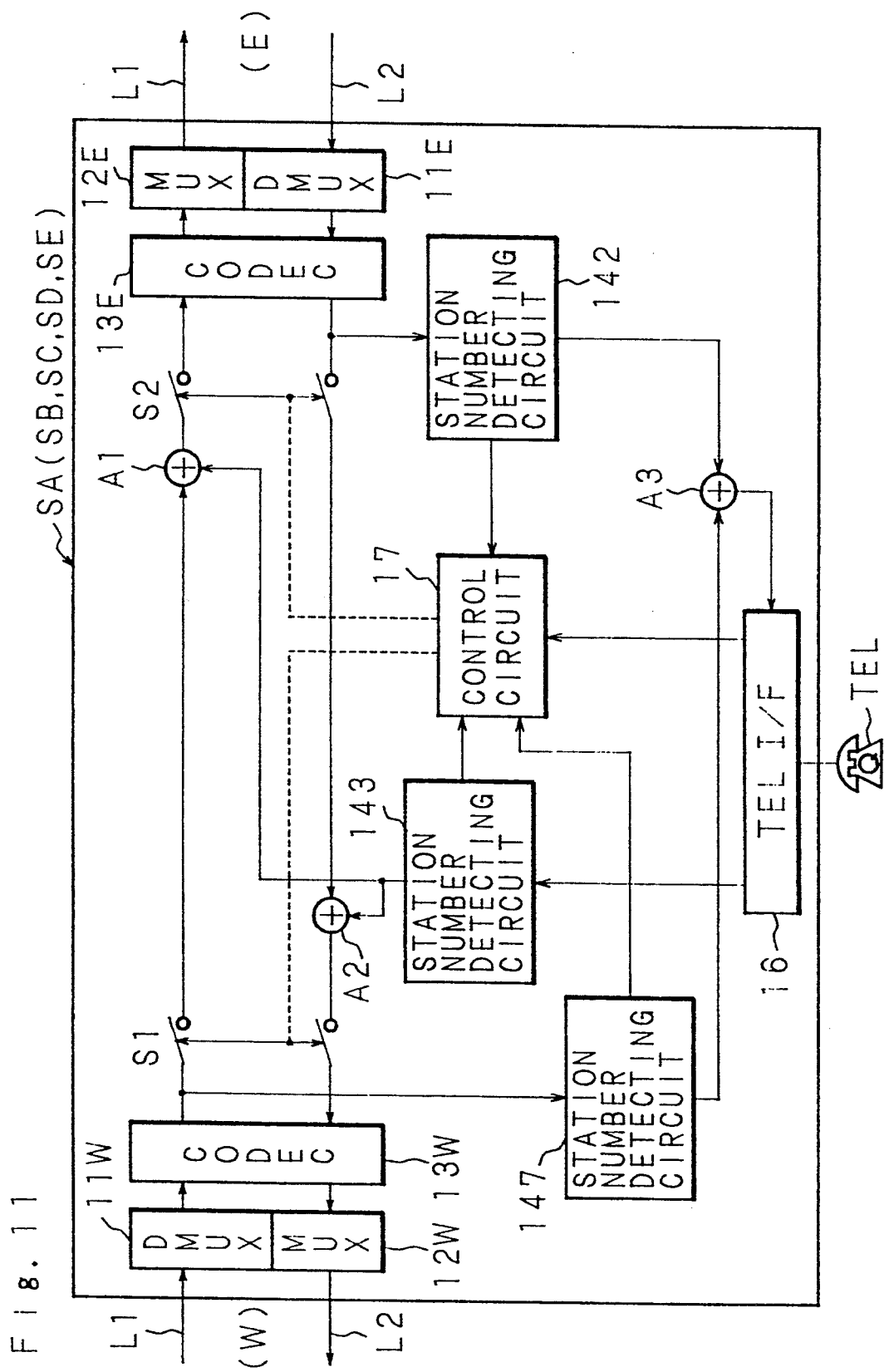
FIG. 11 is a block diagram showing a further embodiment of the present invention.

FIG. 11 is a block diagram showing a configuration example in which the station number detecting circuits 141 and 142 are respectively put between the switch S1 and the codec circuit 13W, and between the switch S2 and the codec circuit 13E, this configuration being different from the configuration in FIG. 7. Also in case of the configuration shown in FIG. 11, not only the effect of the present invention is not damaged, but an interrupting communication is also possible when the switch S2 is reset by the station number detecting circuit 142 and the control circuit 17 in case of being called in at the station SC from the E side even during a communication between the stations SA and SC by the orderwire.

Next, explanation will be given on the second invention.

Figure 12:
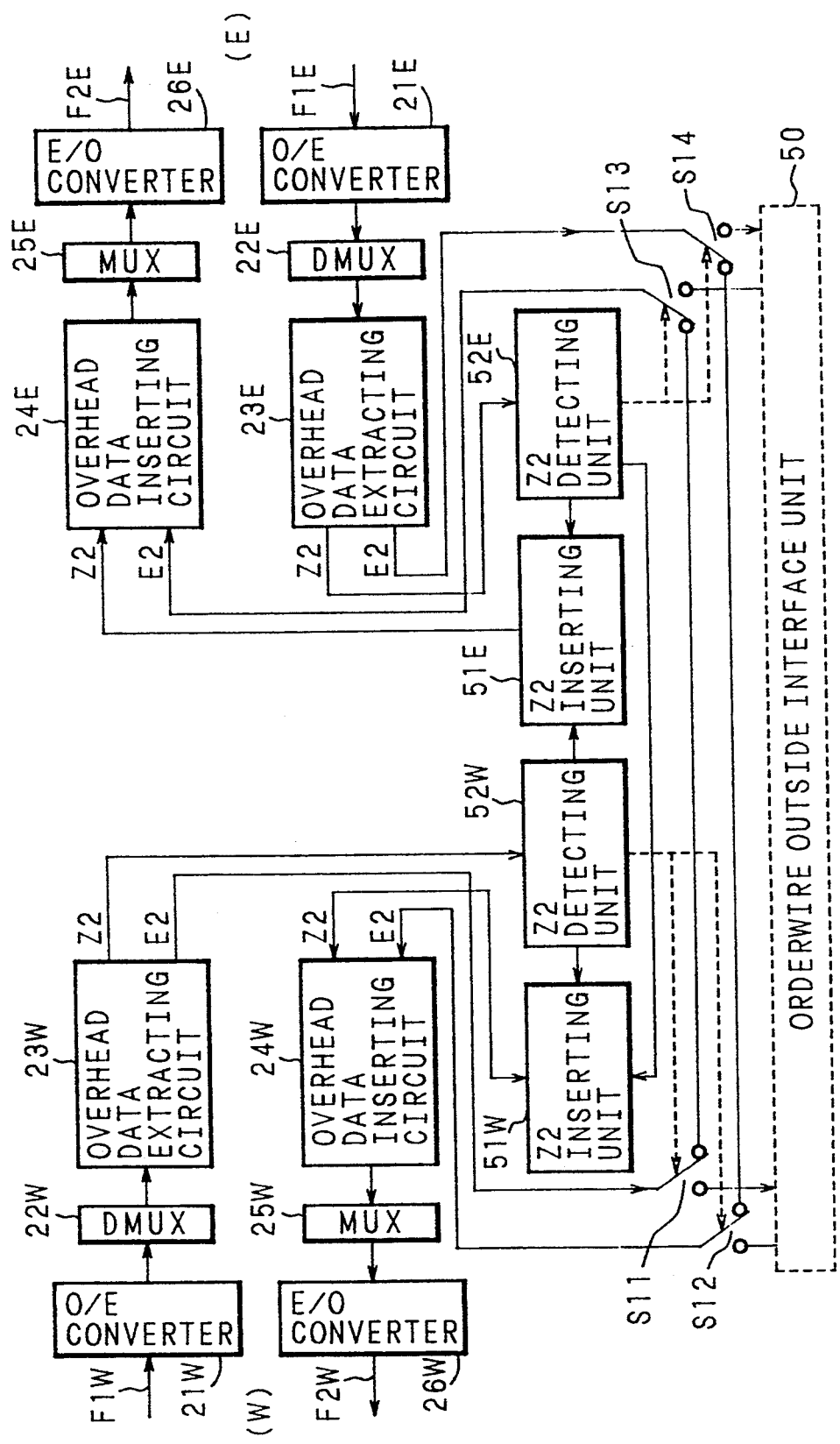
FIG. 12 is a block diagram showing yet another embodiment of the present invention.

FIG. 12 is block diagram showing a configuration example of each of the transmission apparatuses DA, DB, DC, DD and DE of the second invention of the present invention. In addition, the connecting state of each of the transmission apparatus DA, DB, DC, DD and DE is assumed to be the same as a conventional example shown in FIG. 4.

Figure 3:
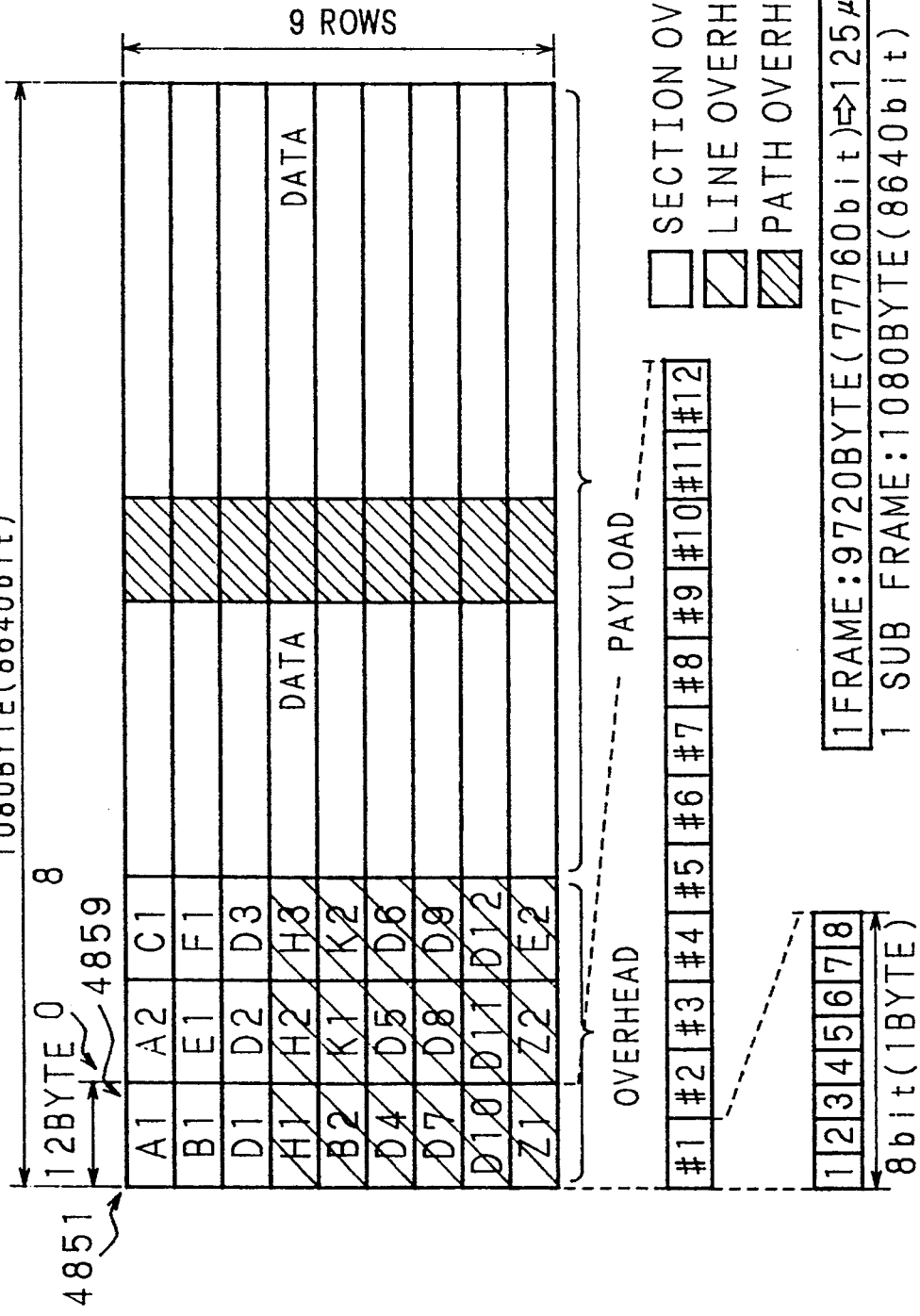
FIG. 3 is a block diagram showing a frame format of the SDH.

In addition, the second invention is characterized in that the Z2 byte for extension prepared in the SDH are intended to be used for controlling the E1 and E2 bytes for the orderwire, however, since the Z2 byte is the line overhead, as shown in FIG. 3, only the E2 byte can be controlled. Therefore, according to the second invention, only the E2 byte of the E1 and E2 bytes prepared for the orderwire is controlled by the Z2 byte.

In FIG. 12, a signal inputting from an optical fiber F1W at the W side is inputted to an overhead data extracting circuit 23W through an O/E converter 21W which performs optical/electric (O/E) conversion and a demultiplexing circuit (DMUX) 22W which demultiplexes a multiplexed signal, and extracted only of the overhead portion thereof. Only the Z2 byte and E2 byte of the overhead portion are extracted and transmitted respectively to a Z2 detecting unit 52W and a switch S11.

In FIG. 12, a signal inputted from an optical fiber F1E at the E side is inputted to an overhead data extracting circuit 23E through an O/E converter 21E which performs O/E conversion, a demultiplexing circuit (DMUX) 22E which demultiplexes a multiplexed signal, and extracted only of the overhead portion thereof. Only the Z2 byte and E2 byte of the overhead portion are extracted and transmitted respectively to a Z2 detecting unit 52E and a switch S14.

Referring character 51W designates a Z2 inserting unit, which inserts the Z2 byte given from the Z2 detecting unit 52W or the Z2 detecting unit 52E to the overhead data and outputs the result to an overhead data inserting unit 24W.

Reference character 51E designates a Z2 inserting unit, which inserts the Z2 byte given from the Z2 detecting unit 52W or the Z2 detecting unit 52E to the overhead data and outputs the result to an overhead data inserting unit 24E.

In the apparatus shown in FIG. 12 are provided with switches S12 and S13 besides the switches S11 and S14 abovementioned.

The abovementioned switches S11, S12, S13 and S14 are usually in the state as shown in FIG. 12, and such a state is the one in which each switch is opened. As shown by broken lines, the switches S11 and S12 are opened/closed by the Z2 detecting unit 52W, and the switches S13 and S14 by the Z2 detecting unit 52E.

To be concrete, the switch S11, in the opening state, outputs the E2 byte extracted by the overhead data extracting circuit 23W, and in the closing state, outputs the E2 byte to the orderwire outside interface unit 50.

The switch S12, in the opening state, outputs a signal from the switch S14 to the overhead data inserting unit 24W, and in the closing state, outputs the E2 byte outputted from the orderwire interface unit 50 to the same.

The switch S13, in the opening state, outputs the E2 byte outputted from the overhead data extracting circuit 23W to the overhead data inserting unit 24E, and in the closing state, outputs the E2 byte outputted from the outside interface unit 50 to the same.

The switch S14, in the opening state, outputs the E2 byte extracted by the overhead data extracting circuit 23E to the switch S12, and in the closing state, outputs the E2 byte extracted by the same to the orderwire interface unit 50.

Accordingly, in the usual state where all of the switches are opened, the E2 byte inputted from either side is through-outputted intact.

In addition, when a telephone communication and a data communication are performed by using the orderwire, the E2 byte is to transmit only a sound signal and a communication data, and does not included a signal for controlling. Therefore, in the present invention, the Z2 byte is used as a signal for controlling. However, in the state where the usual orderwire is not used, the Z2 byte is made to be "00000000", that is, all "0" or "11111111", that is, all "1".

In FIG. 12, a signal inputted from the W side is taken for an example now.

An optical signal inputted from the optical fiber F1W is converted into an electric signal by the O/E converter 21W, demultiplexed by the demultiplexing circuit 22W, and the overhead portion is extracted from the main signal by the overhead data extracting circuit 23W. The Z2 byte of the extracted overhead portion is given to the Z2 detecting unit 52W.

In addition, in the Z2 detecting units 52W and 52E, the calling number of the transmission apparatus is registered as 8 bits data, and 254 kinds of data can be considered except "00000000", and "11111111". Here, for example, "10101010" is assumed to be registered.

When the Z2 byte given to the Z2 detecting unit 52W does not coincidence with the calling number "10101010" (including the case of all "0" and all "1") of this transmission apparatus, all of the switches S11, S12, S13 and S14 keep the opening state. According to the E2 byte is through-outputted from the overhead data extracting circuit 23W to the overhead data inserting unit 24E via the switch S11 and switch S13. At this time, the Z2 detecting unit 52W inserts the Z2 byte which has, been detected at the Z2 detecting unit 52W intact to the Z2 inserting unit 51E. And to the Z2 byte inserting unit, 51W, the Z2 byte detected at the Z2 detecting unit 52E is inserted, not from the Z2 inserting unit 52W. Accordingly, also the Z2 byte is through-outputted intact.

When the Z2 byte inputted from the E side is "10101010", the Z2 detecting unit 52W recognizes that the communication is directed to this transmission apparatus and closes the switches S11 and S12. Thereby, the Z2 byte at the E side can be inputted/outputted also to the orderwire outside interface unit 50 through the switches S11 and S12.

The Z2 detecting unit 52W controls to insert "00000000" or "11111111" to the Z2 inserting unit 51E. In addition, inserting either all "0" or all "1" depends on the transmission system.

The Z2 detecting unit 52W controls the Z2 inserting unit 51W to ignore the Z2 byte from the Z2 detecting unit 52E and to insert "10101010" being the calling number of this transmission apparatus in the Z2 byte. Thereby, transmitting/receiving of the E2 byte is enable.

When the Z2 detecting unit 52W detects the Z2 byte other than "10101010", it recognizes that the communication to this transmission apparatus is finished and returns to a usual state. That is, the switches S11 and S12 are opened, the Z2 inserting unit 51E is controlled to insert intact the Z2 byte detected at the Z2 detecting unit 52W, and the Z2 inserting unit 51W is controlled to insert the Z2 byte detected at the Z2 byte detecting unit 52E.

In order to avoid a malfunction caused by an error of the Z2 byte, the Z2 detecting unit 52W and the Z2 detecting unit 52E recognize the Z2 byte not only by one detection, but by providing a circuit for forward and backward protections.

Figure 5:
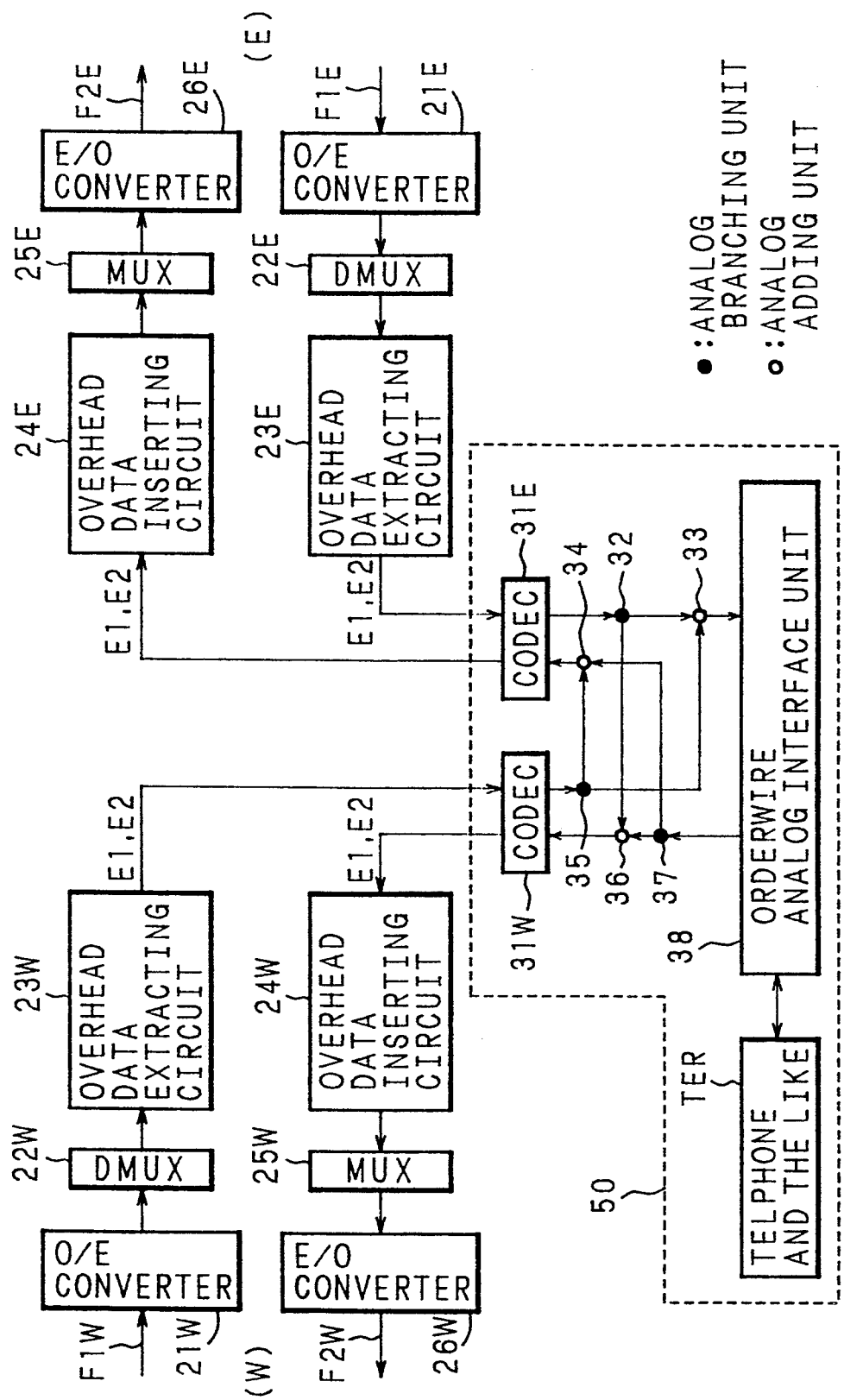
FIG. 5 is a block diagram showing a configuration of a conventional apparatus for time slot interchanging of the orderwire of the SDH.

Now, a case where the Z2 byte from the E side is coincided with the calling number of this transmission apparatus at the Z2 detecting unit 52E, on the assumption that the Z2 byte is detected at the Z2 detecting unit 52W to control the respective switches and inserting of Z2 byte, and the W side is in the state of transmitting/receiving, is taken for an example. In the configuration of the orderwire outside interface unit 50 is the same as shown in FIG. 5, the operation at the E side are same as those at the W side. But when a data communication is performed with using a modem or the like, since there is a fear of a data error, the configuration of the transmission apparatus is such that signal at one side is ignored when signal at the other side is transmitted/received.

Figure 6:
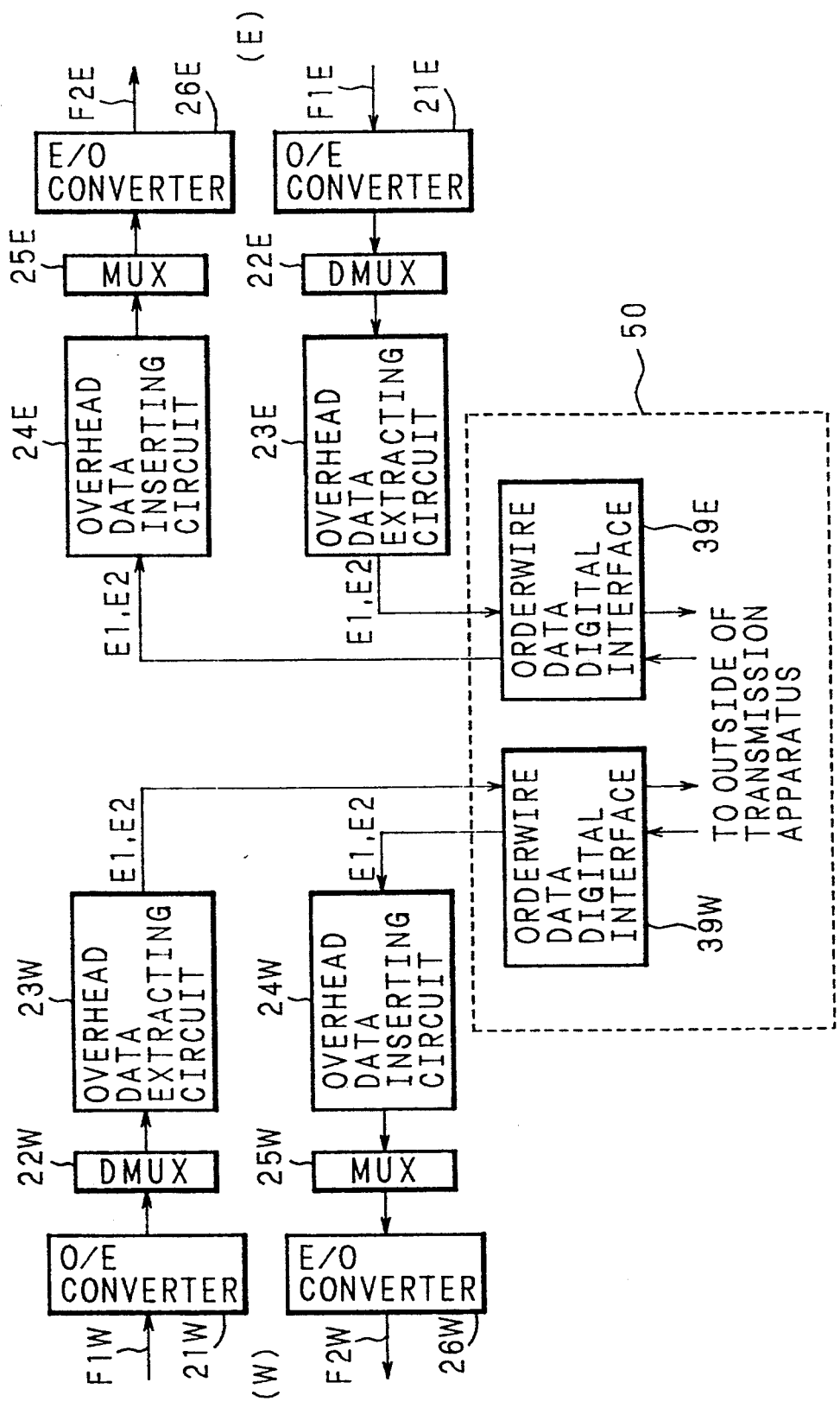
FIG. 6 is a block diagram showing another example of a configuration of a conventional apparatus for time slot interchanging the orderwire of the SDH.

When the configuration of the orderwire outside interface unit 50 is same as that of the conventional example shown in FIG. 6, since the W side and E side are completely independent, it is possible to perform transmitting/receiving to the both sides at the same time.

When a transmission is performed from one transmission apparatus to the other transmission apparatus, at first, the Z2 byte is supervised at the Z2 detecting unit 52W and the Z2 detecting unit 52E to recognize it to be all "1" or all "0". In other cases, since the other transmission apparatuses are performing communication, transmission can not be performed.

When the Z2 byte is all "0" or all "1", all of the switches S11, S12, S13 and S14 are so controlled as to be closed and the destination calling number is inserted from the Z2 inserting units 51W arid 51E to the Z2 byte. When the destination calling number that is sent back at the Z2 detecting unit 52W or Z2 detecting unit 52E is recognized, the E2 byte is transmitted/received.

When the destination calling number of another transmission apparatus is detected at the Z2 detecting unit 51W, all "0" or all "1" is inserted at the Z2 inserting unit 51E. When the destination calling number is detected at the Z2 detecting unit 52E, the same control is performed at the Z2 inserting unit 51W.

Figure 4:
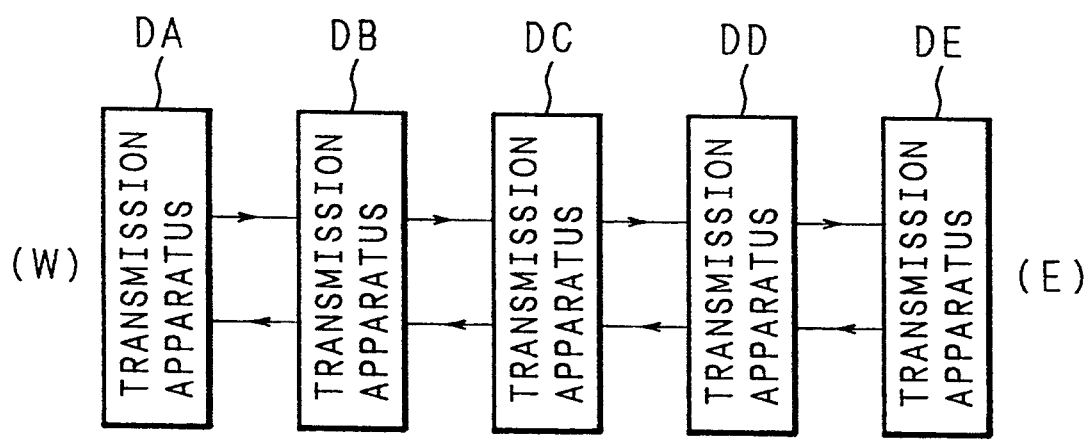
FIG. 4 is a schematic diagram showing a general orderwire line of the SDH.

Next, explanation will be given on the actual operation at a transmission system to which the transmission apparatuses DA, DB, DC, DD and DE as shown in FIG. 4 are connected.

The calling numbers "00000001", "00000010", "00000011", "00000100" and "00000101" are assumed to be set to the respective transmission apparatus DA, DB, DC, DD and DE in advance in this order.

Here, in the state where the usual orderwire is not used, the Z2 byte is assumed to be "00000000", that is, all "0".

As an example, explanation will be given on the transmitting/receiving between the transmission apparatuses DC and DA.

At first, the transmission apparatus DC calls out the apparatus DA to communicate. The Z2 detecting unit 52W and the Z2 detecting unit 52E supervise the Z2 byte and recognize it to be all "0". In other cases, since the other transmission apparatuses are performing communication, the transmission apparatus DC can not perform transmitting/receiving.

When the Z2 byte is recognized to be all "0", all of the switches S11, S12, S13 and S14 are closed, and the calling number "00000001" of the transmission apparatus DA is inserted to the Z2 byte from the Z2 inserting unit 51W and the Z2 inserting unit 51E.

At the transmission apparatuses DB and DC, since the respective Z2 detecting unit 52E and the Z2 detecting unit 52W recognize that the transmission is not destined for this transmission apparatus, the Z2 byte and E2 byte are passed through intact as a digital signal.

At the transmission apparatus DA, since the Z2 detecting unit 52E recognizes that the transmission is destined for the apparatus DA, the switches S13 and S14 are closed, and the calling number "00000001" of the transmission apparatus DA is inserted to the Z2 byte of the transmission apparatus DA from the transmission apparatus DA.

At the transmission apparatus DB, since the respective switches S11, S12, S13 and S14 are controlled to be in the state of digital through as aforementioned, the Z2 byte from the transmission apparatus DA is outputted intact to the transmission apparatus DC.

At the transmission apparatus DC, after the Z2 detecting unit 52W recognized the return of the calling number of the transmission apparatus DA, the Z2 byte is transmitted/received. Since the Z2 detecting unit 52W detects the calling number "00000001" of the transmission apparatus DA, the Z2 inserting unit 51E inserts all "0" to the Z2 byte. Thereby, the lines for transmitting/receiving between the transmission apparatuses DA and DC is set.

In this state, when the transmission apparatus DB is intended to perform a transmission, since it recognizes the state being incapable of transmitting by supervising the Z2 byte and does not perform time slot interchanging, the line set between the transmission apparatus is maintained. Since all "0" is inserted to the Z2 byte at the Z2 inserting unit 51E of the transmission apparatus DC, it is also possible to perform a communication also between the transmission apparatuses DD and DE.

At the time that the transmission apparatus DC finishes communication, all "0" is inserted to the Z2 byte at the Z2 inserting unit 51W of the transmission apparatus DC.

Since the transmission apparatus DB still keeps the state of digital through, the Z2 byte outputted from the transmission apparatus DC is inputted intact to the transmission apparatus DA. By detecting all "0" at the Z2 detecting unit 52E, the transmission apparatus DA recognizes that the communication destined for itself has finished, and inserts all "0" to the Z2 byte from the Z2 inserting unit 51E to output it.

Thereby, a communication by the orderwire between the transmission apparatuses DA and DC is finished and the state returns to the usual one.

As described above, according to the first invention of the present invention, when the orderwire line is interchanged between the two signal transmission apparatuses (stations), since the section between them is separated from the other part of the line, a crosstalk is not caused and time slot interchanging is possible other than a section being used for communication.

According to the second embodiment of the present invention, since time slot interchanging of the orderwire line can be informed by the Z2 byte to the respective signal transmission apparatus, the orderwire line being used is protected, and crosstalk is avoided, the time slot interchanging of a section other than a section being used for communication can be possible.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A time slot interchange apparatus, being provided for respective signal transmission apparatus (SA, SB, SC, SD, SE) to each of which an inherent station number different from each other is given, for a maintenance dedicated line of one line included in a transmission system in which signal transmission apparatuses (SA, SB, SC, SD and SE) are connected, comprising:

a first station number detecting circuit (141) receiving a signal from a station at one side of said line and detecting a station number from said signal from said one side (W side) of the line at calling in;

a second station number detecting circuit (142) receiving a signal from a station at other side of said line and detecting a station number from said signal from the other side (E side) of the line at calling in;

a third station number detecting circuit (143) for detecting a station number of the station at said one side and of the station at the other side at calling out;

first switching means (S1) provided at said one side (W) for on/off switching said one side (W side) of the line to connect said one side to and disconnect said other side from said apparatus;

second switching means (S2) provided at said other side (E) for on/off switching said other side (E side) to connect said other side to and disconnect said other side from said apparatus; and a control circuit (17), coupled to said first and second switching means, for switching said first switching means (S1) to be on and said second switching means (S2) to be off when said first station number detecting circuit (141) detects the own station number inherent to said station, switching said first switching means (S1) to be off and said second switching means (S2) to be on when said second station number detecting circuit (142) detects the own station number, switching said first switching means (S1) to be on and said second switching means (S2) to be off when said third station number detecting circuit (143) detects the station number of the station at one side (W side), and switching said first switching means (S1) to be off and said second switching means (S2) to be on when said third station detecting circuit (143) detects the station number of the station at the other side (E side).

2. A time slot interchange apparatus for a maintenance dedicated line of a signal transmission apparatus as set forth in claim 1, wherein a connecting position of said first station number detecting circuit (141) with said one side (W side) of the line is outside more than said first switching means (S1), and a connecting position of said second station number detecting circuit (142) with the other side (E side) of the line is outside more than said second switching means (S2).

3. A time slot interchange apparatus, being provided for respective signal transmission apparatus (DA, DB, DC, DD, DE) to each of which an inherent station number different from each other is given and a specific area (E2) in a frame of a signal is allocated as a maintenance dedicated line, said signal being transmitted through a transmission system in which signal transmission apparatuses (DA, DB, DC, DD, DE) are connected, comprising:

a first detecting circuit (52W) to be coupled to one side of the line for detecting a content of a predetermined area (Z2) in a frame of a signal inputted from a station at said one side (W side) of the line;

a second detecting circuit (52E) to be coupled to other side of the line, for detecting a content of a predetermined area (Z2) in a frame of a signal inputted from a station at said other side (E side) of the line;

a first setting circuit (51W), coupled to said first detecting unit, for setting a content of a predetermined area (Z2) in a frame of a signal outputted to said one side (W side) of the line;

a second setting circuit (51E), coupled to said second detecting unit, for setting a content of a predetermined area (Z2) in a frame of a signal outputted to said other side (E side) of the line;

an outside interface (50);

first switching means (S11, S12), coupled to said first detecting circuit (52W) and said outside interface, for switching connection of said one side (W side) of the line to the other side (E side) or to said outside interface (50); and second switching means (S13, S14), coupled to said second detecting circuit (52E) and said outside interface, for switching connection of the other side (E side) of the line to said one side (W side) or to said outside interface (50);

wherein, when said first detecting circuit (52W) detects that the content of said predetermined area (Z2) is a data representing the own station number, said first detecting circuit (52W) makes said first switching means (S11, S12) connect with said outside interface (50) and said second setting circuit (51E) sets in said predetermined area (Z2) data showing that said specific area (E2) is not used and outputs said set data to the other side (E side) of the line, when said second detecting circuit (52W) detects that the content of said predetermined area (Z2) is a data representing the own station number, said second detecting circuit (52E) makes said second switching means (S13, S14) connect with said outside interface (50), and said first setting circuit (51W) sets in said predetermined area (Z2) data showing that said specific area (E2) is not used and outputs said set data to the one side (W side) of the line, and wherein when said first and second detecting circuits (52W, 52E) detect that the content of said predetermined area (Z2) is a data showing that said specific area (E2) is not used, said first and second detecting circuits (52W, 52E) make said first and second switching means (S11, S12, S13, S14) connect with said outside interface (50), and said first and second setting circuits (51W, 51E) set in said specific areas (E2) data showing the station number of the other signal transmission station and output said showing data to the line thereby calling is performed.

* * * * *